US008279296B2

(12) United States Patent
Kimura et al.

(10) Patent No.: US 8,279,296 B2
(45) Date of Patent: Oct. 2, 2012

(54) INFORMATION PROCESSING APPARATUS, IMAGE-CAPTURING SYSTEM, REPRODUCTION CONTROL METHOD, RECORDING CONTROL METHOD, AND PROGRAM

(75) Inventors: Manabu Kimura, Kanagawa (JP); Tomoki Kanesaka, Chiba (JP); Yusuke Tani, Kanagawa (JP)

(73) Assignee: Sony Corporation, Tokyo (JP)

( * ) Notice: Subject to any disclaimer, the term of this patent is extended or adjusted under 35 U.S.C. 154(b) by 512 days.

(21) Appl. No.: 12/481,901

(22) Filed: Jun. 10, 2009

(65) Prior Publication Data

US 2009/0309987 A1    Dec. 17, 2009

(30) Foreign Application Priority Data

Jun. 11, 2008   (JP) ................................ P2008-153557

(51) Int. Cl.
  *H04N 5/225*      (2006.01)
(52) U.S. Cl. ........... 348/218.1; 348/36; 348/37; 348/38; 348/39; 348/239
(58) Field of Classification Search ........................ None
  See application file for complete search history.

(56) References Cited

U.S. PATENT DOCUMENTS

2004/0085451 A1* 5/2004 Chang ........................... 348/159
2005/0212909 A1* 9/2005 Takehara et al. ................. 348/36

FOREIGN PATENT DOCUMENTS

| JP | 9-322055 | | 12/1997 |
| JP | 2000-261794 | | 9/2000 |
| JP | 2003-141562 | | 5/2003 |
| JP | 2003-209769 | | 7/2003 |
| JP | 2003209769 A | * | 7/2003 |
| JP | 2005-333552 | | 12/2005 |

* cited by examiner

*Primary Examiner* — Nhan T Tran
*Assistant Examiner* — Yih-Sien Kao
(74) *Attorney, Agent, or Firm* — Frommer Lawrence & Haug LLP; William S. Frommer; Thomas F. Presson

(57) ABSTRACT

An information processing apparatus includes a video obtaining unit configured to obtain a plurality of items of video data captured by a plurality of image-capturing devices; a position information obtaining unit configured to obtain position information including an orientation and an angle of view of each of the image-capturing devices; a reproduction position calculation unit configured to calculate a reproduction position of each item of the video data so that a projection direction and an angle of view of the item of the video data matches the orientation and the angle of view of a corresponding one of the image-capturing devices by using the position information; and a reproduction controller configured to reproduce each item of the video data at the corresponding reproduction position.

9 Claims, 13 Drawing Sheets

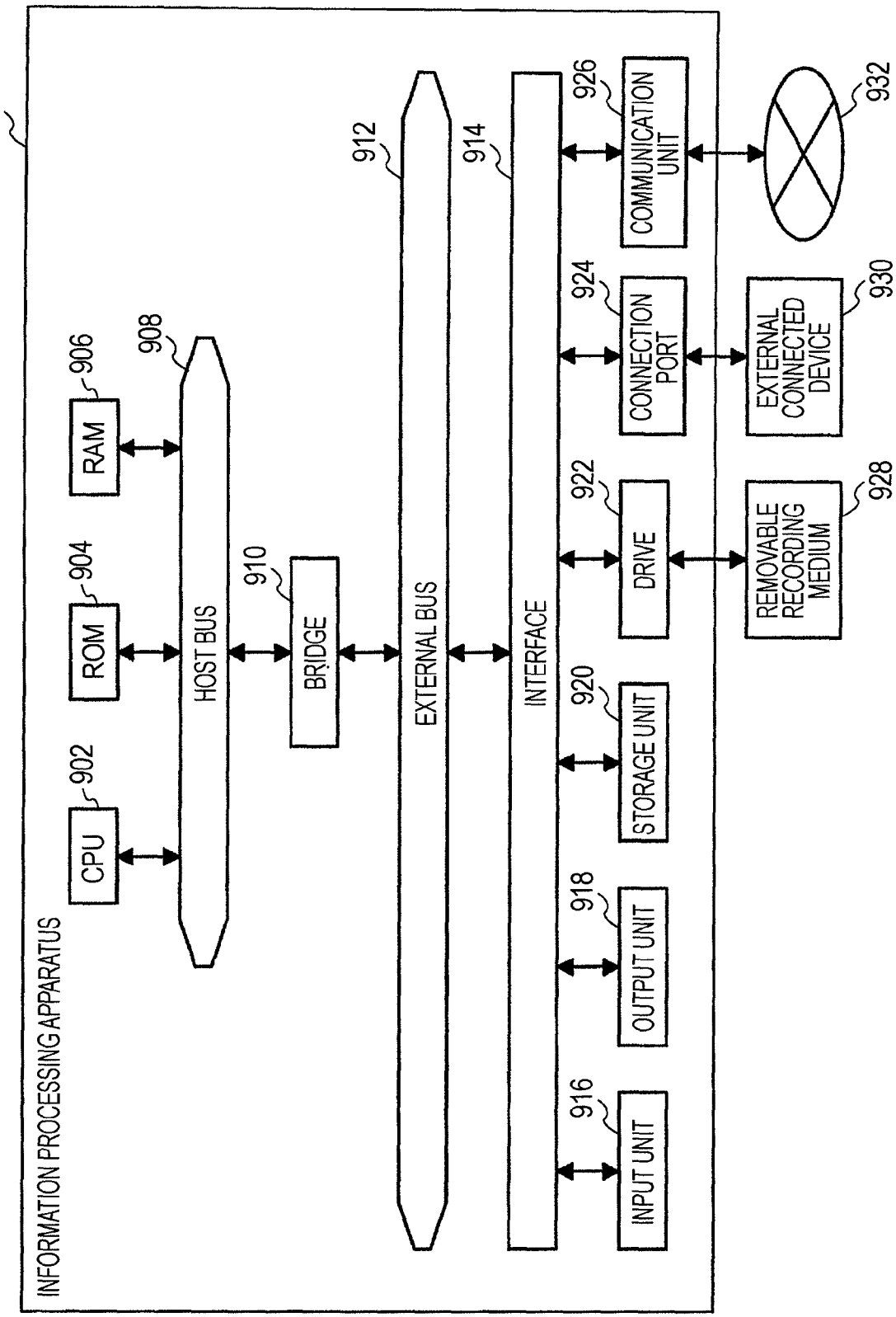

INFORMATION PROCESSING APPARATUS, IMAGE-CAPTURING SYSTEM, REPRODUCTION CONTROL METHOD, RECORDING CONTROL METHOD, AND PROGRAM

BACKGROUND OF THE INVENTION

1. Field of the Invention

The present invention relates to an information processing apparatus, an image-capturing system, a reproduction control method, a recording control method, and a program.

2. Description of the Related Art

In a case where a sport that is played in a wide field like soccer or American football is to be filmed, zoom image-capturing in which image capturing is performed using a zoom lens while tracking the motion of individual players, or wide-angle image capturing in which the entire field is filmed from bird's eye view is performed. Among the two methods, in order to confirm in what formation a plurality of players are moving or in order to analyze how each player is moving over the entire field, a video captured over a wide angle is used.

In order to perform such wide-angle image capturing, a wide-angle lens having a wide angle of view is used. Furthermore, in order to capture the entire wide field on one image plane, a technique of combining videos captured using a plurality of cameras so as to create a panoramic video has been considered. Regarding a technology for combining images, for example, in Japanese Unexamined Patent Application Publication No. 2003-141562 described below, a technology for mapping a nonplanar image represented in three-dimensional coordinates onto a two-dimensional plane has been disclosed. In contrast, in Japanese Unexamined Patent Application Publication No. 2003-209769 described below, a technology for displaying a panoramic image on a plurality of image planes has been disclosed. Furthermore, in Japanese Unexamined Patent Application Publication No. 9-322055 described below, a technology for creating a panoramic image by capturing a plurality of images while one camera is being moved and by combining the plurality of images on the basis of the movement information has been disclosed.

SUMMARY OF THE INVENTION

In order to capture one subject as a plurality of images and join these subject images so as to be formed into a panoramic view, it is necessary to combine the plurality of subject images after the positions of the images have been adjusted. In Japanese Unexamined Patent Application Publication No. 9-322055 described above, a technology in which a plurality of images are captured using one camera while moving, and duplicated areas of the subject images are predicted and detected on the basis of the movement information has been described. Furthermore, for combining satellite photographs, and the like, a technology in which the duplicated portions of a plurality of images are detected by map matching, and the plurality of images are combined so that the duplicated portions match each other exists.

However, in order to perform map matching, very powerful computation performance is demanded. For this reason, at the time of capturing a video scene that changes moment by moment like a sports relay, it is not practical for individual videos to be combined by map matching so as to be formed into a panoramic view. Furthermore, an image processing apparatus that performs such a combining process is very expensive. Furthermore, when captured videos are joined together so as to create a panoramic video while one camera is being moved, the video of a subject in motion is disturbed. Such a panoramic-view creation technique is suitable for capturing a still subject like a landscape, but is not applicable to a sports relay.

It is desirable to provide a new and improved information processing apparatus capable of creating a panoramic view of videos of a subject in motion, which is captured using a plurality of cameras, with a low computation load, an image-capturing system, a reproduction control method, a recording control method, and a program.

According to an embodiment of the present invention, there is provided an information processing apparatus including a video obtaining unit configured to obtain a plurality of items of video data captured by a plurality of image-capturing devices; a position information obtaining unit configured to obtain position information including an orientation and an angle of view of each of the image-capturing devices; a reproduction position calculation unit configured to calculate a reproduction position of each item of the video data so that a projection direction and an angle of view of the item of the video data matches the orientation and the angle of view of a corresponding one of the image-capturing devices by using the position information; and a reproduction controller configured to reproduce each item of the video data at the corresponding reproduction position.

As described above, in the information processing apparatus, the video obtaining unit obtains a plurality of items of video data captured using a plurality of image-capturing devices. Furthermore, the information processing apparatus causes the position information obtaining unit to obtain the position information including the orientation and the angle of view of each of the above-described image-capturing devices. Furthermore, the information processing apparatus causes the reproduction position calculation unit to calculate the position at which each item of the corresponding video data is reproduced by using the position information so that the projection direction and the angle of view of each item of the video data matches the orientation and the angle of view of each of the image-capturing devices. Then, the information processing apparatus causes the reproduction controller to play back each item of the video data at each of the reproduction positions. With such a configuration, it becomes possible to combine and display a plurality of videos without performing a computation process with a large load.

The video obtaining unit may obtain a plurality of items of video data captured at the same time by the plurality of image-capturing devices so that portions of image-capturing ranges thereof overlap each other. In this case, the reproduction controller may reproduce the plurality of items of video data so that the plurality of items of video data that are displayed in the foreground is displayed and the video data to be displayed in the background is not displayed with respect to the overlapping portions of the video data.

The reproduction position calculation unit may calculate a plane area on which a corresponding item of the video data is projected as the reproduction position in a virtual three-dimensional space including the depth direction of a display screen. In this case, the reproduction controller may reproduce each item of the video data in such a manner that the item of the video data is projected on the corresponding plane area in the virtual three-dimensional space, the plane area being calculated as the corresponding reproduction position.

The information processing apparatus may further include a direction controller configured to control the orientations of the plurality of image-capturing devices so that portions of image-capturing ranges thereof overlap each other; an angle-of-view adjustment unit configured to adjust the angle of view of each of the image-capturing devices; a position information recorder configured to record, as position information, the orientation of each of the image-capturing devices controlled by the direction controller and the angle of view of each of the image-capturing devices adjusted by the angle-of-view adjustment unit; and a storage unit in which video data captured by each of the image-capturing devices and the position information are recorded. In this case, the video obtaining unit may obtain the video data from the storage unit, and the position information obtaining unit may obtain the position information from the storage unit.

According to another embodiment of the present invention, there is provided an information processing apparatus including a direction controller configured to control the orientations of a plurality of image-capturing devices so that portions of an image-capturing range overlap each other; an angle-of-view adjustment unit configured to adjust the angle of view of each of the image-capturing devices; a position information recorder configured to record, as position information, the orientation of each of the image-capturing devices controlled by the direction controller and the angle of view of each of the image-capturing devices adjusted by the angle-of-view adjustment unit; and a storage unit in which video data captured by each of the image-capturing devices and the position information are recorded.

According to another embodiment of the present invention, there is provided an image-capturing system including a plurality of image-capturing units capable of changing their individual image-capturing directions and angles of view; a direction controller configured to control the orientation of each of the plurality of image-capturing units so that portions of image-capturing ranges thereof overlap each other; an angle-of-view adjustment unit configured to adjust the angle of view of each of the image-capturing units; a position information recorder configured to record, as position information, the orientation of each of the image-capturing units controlled by the direction controller and the angle of view of each of the image-capturing units adjusted by the angle-of-view adjustment unit; and a storage unit in which video data captured by each of the image-capturing units and the position information are recorded.

According to another embodiment of the present invention, there is provided a reproduction control method including the steps of obtaining a plurality of items of video data captured by a plurality of image-capturing devices; obtaining position information including an orientation and an angle of view of each of the image-capturing devices; calculating the reproduction position of each item of video data so that the projection direction and the angle of view of the item of the video data matches the orientation and the angle of view of a corresponding one of the image-capturing devices by using the position information; and performing control so that each item of the video data is reproduced at the corresponding reproduction position.

According to another embodiment of the present invention, there is provided a recording control method including the steps of controlling orientations of a plurality of image-capturing devices so that portions of image-capturing ranges overlap each other; adjusting the angle of view of each of the image-capturing devices; recording, as position information, the orientation of each of the image-capturing devices controlled in the step of controlling orientations and the angle of view of each of the image-capturing devices adjusted in the step of adjusting an angle of view; and recording video data captured by each of the image-capturing devices.

According to another embodiment of the present invention, there is provided a program for causing a computer to implement a reproduction control method including the steps of obtaining a plurality of items of video data captured by a plurality of image-capturing devices; obtaining position information including an orientation and an angle of view of each of the image-capturing devices; calculating the reproduction position of each item of video data so that the projection direction and the angle of view of the item of the video data matches the orientation and the angle of view of a corresponding one of the image-capturing devices by using the position information; and performing control so that each item of the video data is reproduced at the corresponding reproduction position.

According to another embodiment of the present invention, there is provided a program for causing a computer to implement a recording control method including the steps of controlling orientations of a plurality of image-capturing devices so that portions of image-capturing ranges overlap each other; adjusting the angle of view of each of the image-capturing devices; recording, as position information, the orientation of each of the image-capturing devices controlled in the step of controlling orientations and the angle of view of each of the image-capturing devices adjusted in the step of adjusting an angle of view; and recording video data captured by each of the image-capturing devices.

As has been described above, according to embodiments of the present invention, it becomes possible to create a panoramic view of videos of a subject in motion captured using a plurality of cameras with a low computation load.

BRIEF DESCRIPTION OF THE DRAWINGS

FIG. 13 is an illustration showing an example of the hardware configuration of the information processing apparatus according to the present embodiment.

DESCRIPTION OF THE PREFERRED EMBODIMENTS

Figure 1:
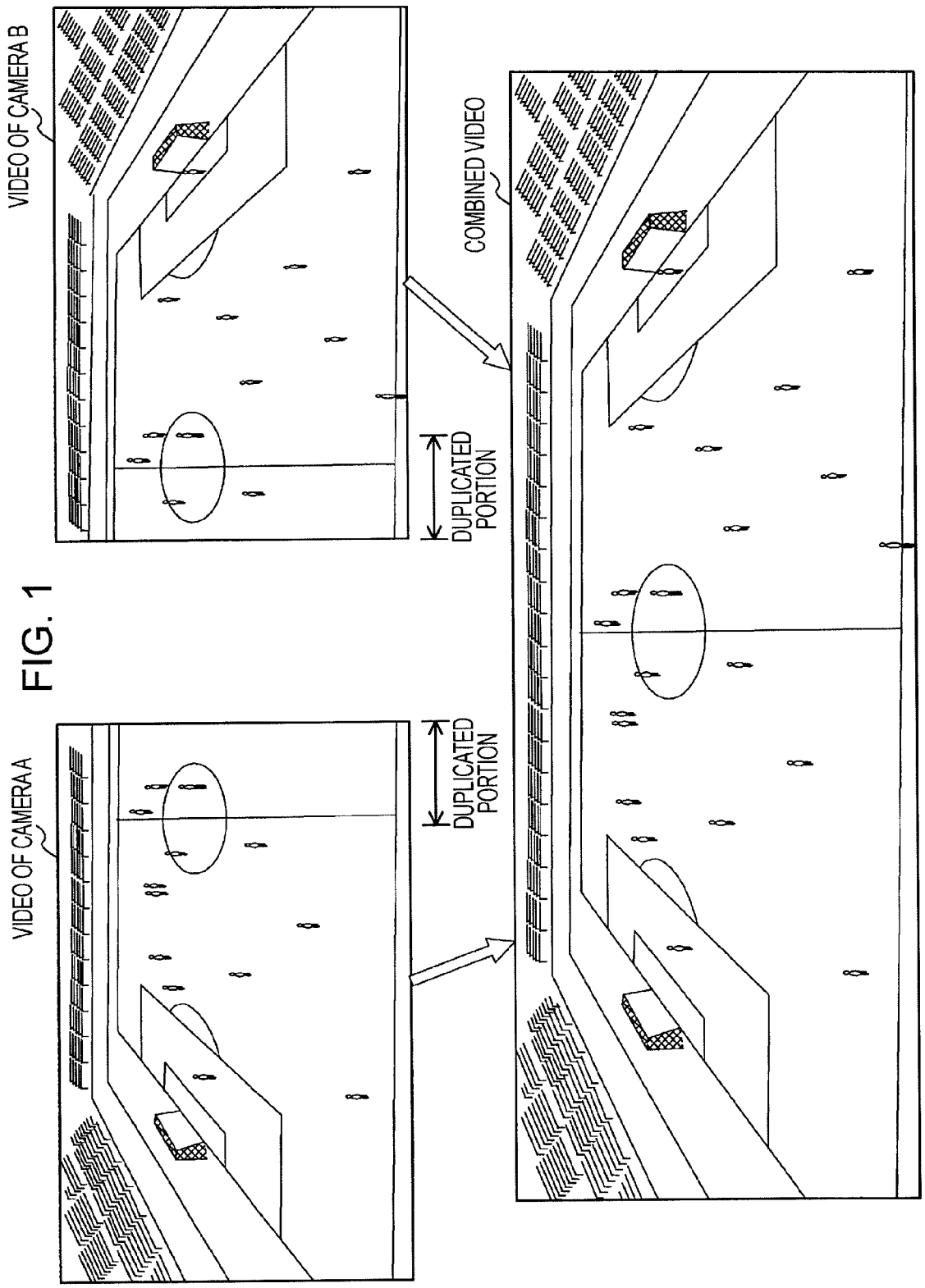
FIG. 1 is an illustration showing videos captured using two cameras and a combined video thereof.

Preferred embodiments of the present invention will be described in detail below with reference to the attached drawings. In this specification and the drawings, components having substantially the same functions are designated with the same reference numerals, and accordingly, duplicated descriptions thereof are omitted.

The Structure of the Present Document

The structure of the present document is as follows.

First, an object of the embodiment according to the present invention is described, and then, an apparatus and a method for implementing the object will be described in detail below. First, the system configuration of an image-capturing system according to the present embodiment will be described. Next, the function configuration of an image-capturing device included in the image-capturing system will be described. Furthermore, the function configuration of an information processing apparatus connected to the image-capturing device will be described. After that, the principles of a reproduction control method according to the present embodiment will be described, and the flow of a series of steps related to the reproduction control method will be described. Furthermore, a modification of the image-capturing system according to the present embodiment will be described. Finally, the hardware configuration of the information processing apparatus according to the present embodiment will be described.

Embodiment

An embodiment of the present invention will be described below.

Object

An object of the present embodiment will be described with reference to FIG. 1. FIG. 1 shows two videos captured using two cameras (camera A and camera B), and a combined video formed by combining these two videos. An object of the present embodiment is to create a panoramic view of two videos without necessitating a large number of computations in a video combining process. In the following description, for the convenience of description, a case in which there are two videos is described. In addition, the technology according to the present embodiment can be applied to a case in which three or more videos are combined.

Videos for which the present embodiment is applied are videos that are synchronously captured using a plurality of cameras. However, these videos may be videos in which a subject moves about, and as shown in FIG. 1, they are captured in such a manner that portions of the subject images overlap. As has already been described, in a technology thus far, an image processing technology called map matching has been used to identify the duplicated portions. However, when such an image processing technology is used, high computation performance is necessary to combine videos, and it has been difficult to create a panoramic view of videos unless an expensive apparatus is used. Accordingly, an object of the present embodiment is to solve such a difficulty and to provide a technology for creating a panoramic view of a plurality of videos using an inexpensive apparatus.

System Configuration of Image-Capturing System 10

Figure 2:
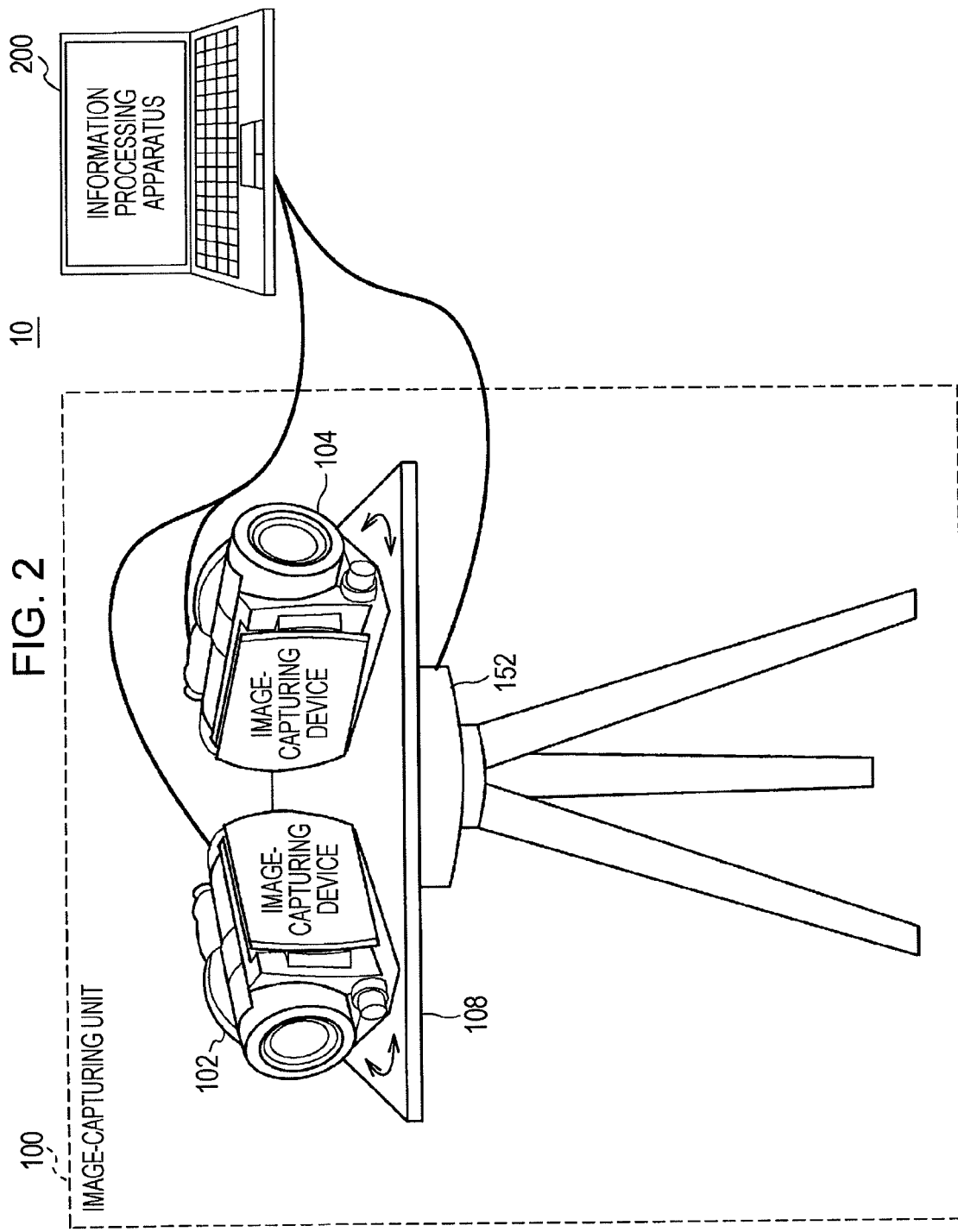
FIG. 2 is an illustration showing the configuration of an image-capturing system according to an embodiment of the present invention.

In order to achieve the above-described object, the inventors of the present invention contrived an image-capturing system 10 shown in FIG. 2. First, referring to FIG. 2, the system configuration of the image-capturing system 10 according to the present embodiment will be described. Although the image-capturing system is represented as an "image-capturing system", as will be described later, it has a function of reproducing a captured video. Therefore, the image-capturing system is substantially a "recording and reproduction system". It is also possible to allow a recording function and a reproduction function to be formed and provided in independent apparatuses. Although the image-capturing system will be described below as an "image-capturing system", of course, such a modification falls under the technical scope of the present embodiment.

As shown in FIG. 2, the image-capturing system 10 mainly includes an image-capturing unit 100 and an information processing apparatus 200. The image-capturing unit 100 and the information processing apparatus 200 are connected to each other using predetermined connection means.

For the predetermined connection means, for example, a connection cable, such as a USB or IEEE 1394 cable, or wireless communication means, such as Bluetooth (registered trademark) or a wireless LAN (WLAN), is used. Here, USB refers to a universal serial bus, and WLAN refers to a wireless local area network. Of course, other connection means may also be used. In some cases, video data captured using the image-capturing unit 100 may be recorded on a removable recording medium, and may be read from the information processing apparatus 200.

The image-capturing unit 100 includes, for example, a plurality of image-capturing devices 102 and 104, a rack 108, and a driving controller 152. In the following, a description will be given by limiting the number of image-capturing devices to two. The technology of the present embodiment can be extended to the image-capturing unit 100 including three or more image-capturing devices. Furthermore, the shape of the rack 108 and the presence or absence of the driving controller 152 are weakly related to the indispensable portion of the technology according to the present embodiment and therefore can be changed as appropriate. In the following description, there is a case in which the image-capturing device 102 is referred to as a camera B and the image-capturing device 104 is referred to as a camera A.

As shown in FIG. 2, the image-capturing devices 102 and 104 are placed on the rack 108. The image-capturing devices 102 and 104 are mechanically connected to the rack 108 via a driving mechanism (not shown). For this reason, it is possible for the image-capturing devices 102 and 104 to change their orientation on the rack 108. A driving mechanism provided on the rack 108 is driven and controlled manually or by the driving controller 152. For example, it is possible for the driving controller 152 to control the image-capturing direction of the image-capturing devices 102 and 104 so that the image-capturing range of the two image-capturing devices 102 and 104 include a duplicated portion with respect to each other as in the example shown in FIG. 1.

Furthermore, the driving controller 152 may be electrically connected to the image-capturing devices 102 and 104. In this case, the driving controller 152 controls the optical system of the image-capturing devices 102 and 104, and the like, and controls the focal length of the image-capturing devices 102 and 104, and the like. As will be described later, the angles of view of the image-capturing devices 102 and 104 are determined on the basis of the dimensions and the focal lengths of the image-capturing elements installed on the image-capturing devices 102 and 104. For this reason, by controlling the relative orientations of the two image-capturing devices 102 and 104 and by adjusting the angles of view thereof, it is possible for the driving controller 152 to perform control so that two videos captured using the image-capturing devices 102 and 104 include a duplicated portion.

In the example of FIG. 2, the two image-capturing devices 102 and 104 are arranged so as to be pointing outward with respect to each other. However, there is a case in which they are arranged so as to be pointing inward with respect to each other or by the driving controller 152.

In the foregoing, an example of the system configuration of the image-capturing system 10 has been described. With such a configuration, it is possible for the image-capturing system 10 to cause the image-capturing unit 100 including a plurality of image-capturing devices 102 and 104 to capture a plurality of subject images including duplicated portions. Then, the videos captured by the image-capturing unit 100 are transmitted to the information processing apparatus 200. The function configuration of the image-capturing devices 102 and 104 and the information processing apparatus 200 will be described in detail below.

Function Configuration of Image-Capturing Devices 102 and 104

Figure 3:
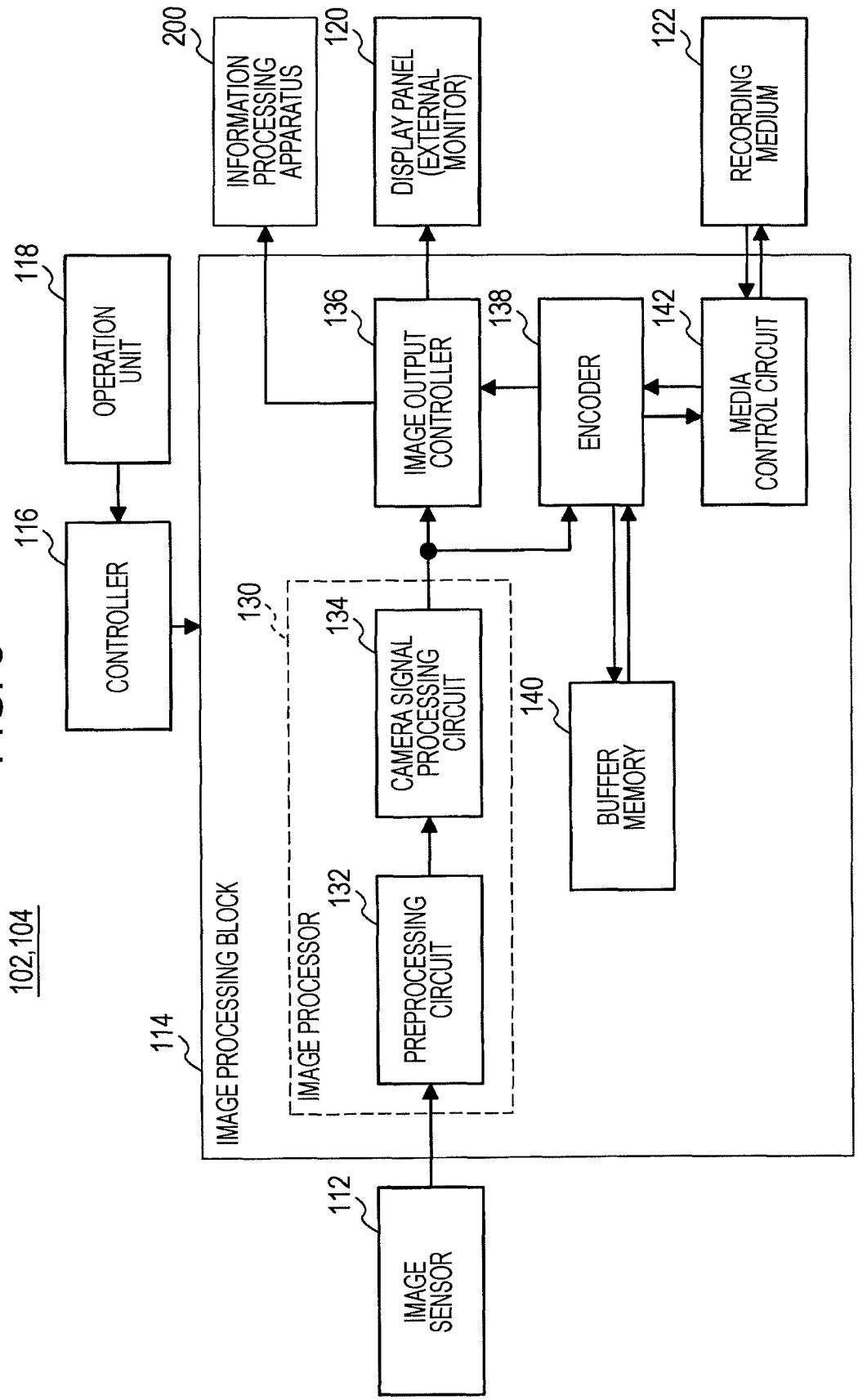
FIG. 3 is an illustration showing an example of functions of an image-capturing device according to the present embodiment.

First, referring to FIG. 3, the function configuration of the image-capturing devices 102 and 104 according to the present embodiment will be described. FIG. 3 is an illustration showing an example of the function configuration of the image-capturing devices 102 and 104 according to the present embodiment.

As shown in FIG. 3, the image-capturing devices 102 and 104 each mainly include an image sensor 112, an image processing block 114, a controller 116, an operation unit 118, a display panel 120, and a recording medium 122.

Image Sensor 112

The image sensor 112 is formed, for example, by a photoelectric conversion element, such as a CCD or a CMOS. The image sensor 112 photoelectrically converts an optical signal input via the optical system and outputs an electrical signal. The electrical signal output from the image sensor 112 is input to the image processing block 114 (image processor 130). In a case where a moving image is to be captured, subject images are continuously input to the image sensor 112, and image signals in page units are successively input to the image processor 130.

Controller 116, Operation Unit 118

The controller 116 is means for controlling the operation of the image processing block 114 in response to user operation using the operation unit 118. For the operation unit 118, for example, operation means, such as a keyboard, a mouse, a remote controller, buttons, a touch panel, a touch pad, an optical sensor, and a cursor, are used. However, in the case of a touch panel, the functions of the operation unit 118 are implemented by a combination with a display panel 120 (to be described later).

Furthermore, the controller 116 may also be configured in such a manner that position information including the orientations, the angles of view, and the like of the image-capturing devices 102 and 104 is obtained, is recorded on the recording medium 122, and is transmitted to an information processing apparatus 200. For example, the controller 116 refers to the control information transmitted from the driving controller 152 or detects a relative position relation from the reference position on the rack 108, thereby obtaining the position information of the image-capturing devices 102 and 104. Furthermore, the controller 116 may obtain position information, such as the angle of view, on the basis of the setting information of the optical system installed on the image-capturing devices 102 and 104. The controller 116 may control an image output controller 136 (to be described later) so as to transmit position information together with a video signal to the information processing apparatus 200.

Display Panel 120

The display panel 120 may be a display monitor or a finder installed on the image-capturing devices 102 and 104, or may be a display monitor connected as an external device to the image-capturing devices 102 and 104. Furthermore, the display panel 120 may be a display panel having an input function of a touch panel or the like. Furthermore, the display panel 120 may be a touch panel with a pressure detection function having a function of detecting a pressing force with which the user presses the screen. The display panel 120 may have a function of detecting the position on the screen that the user touches or is close to in a three-dimensional manner even if the user does not directly touch the screen.

Recording Medium 122

The recording medium 122 is formed by, for example, a magnetic recording medium, an optical recording medium, a magneto-optical recording medium, a semiconductor recording medium, or the like. Video data is recorded on the recording medium 122. Furthermore, on the recording medium 122, various kinds of setting information, meta-information regarding video content, and the like may be recorded. A reading/writing process of the recording medium 122 is controlled by a media control circuit 142 of the image processing block 114 (to be described later).

Image Processing Block 114

The image processing block 114 mainly includes an image processor 130, an image output controller 136, an encoder 138, a buffer memory 140, and a media control circuit 142. The image processor 130 is formed of a preprocessing circuit 132 and a camera signal processing circuit 134.

Preprocessing Circuit 132

The preprocessing circuit 132 includes, for example, a correlated double sampling (CDS) circuit, an automatic gain control (AGC) circuit, an analog-to-digital (A/D) converter, and the like. The CDS circuit is a circuit that removes reset noise contained in the electrical signal input from the image sensor 112. The AGC circuit is a circuit that controls and amplifies the electrical signal up to a predetermined level. The A/D converter is a circuit that converts an analog electrical signal into a digital video signal. The video signal generated by these circuits is input to the camera signal processing circuit 134.

Camera Signal Processing Circuit 134

The camera signal processing circuit 134 includes, for example, a feedback clamp circuit, a white-clip circuit, a base clip circuit, a white-balance circuit, a γ correction circuit, and the like.

The feedback clamp circuit is a circuit for fixing the black level OB (optical black) of the digital image signal to a fixed reference value. The white clip circuit is a limiter circuit in which modulation of a predetermined amplitude or more is not applied so as to prevent over-modulation of an image signal. The base clip circuit is a circuit that clips low-level noise. The white-balance circuit is a circuit that adjusts the white balance. The γ correction circuit is a circuit that performs predetermined γ correction on an image signal. A video signal processed by these circuits is input to the encoder 138 and the image output controller 136.

Encoder 138

The encoder 138 performs an encoding process on a video signal input from the camera signal processing circuit 134 in accordance with a predetermined encoding method. For the predetermined encoding method, for example, a method standardized by MPEG-2, MPEG-4, H.264/AVC, or the like is used. The encoder 138 uses the buffer memory 140 as a frame memory when processing, such as motion compensation interframe difference coding, is performed. The video signal encoded by the encoder 138 is recorded on the recording medium 122 via the media control circuit 142. Furthermore, the encoder 138 inputs the encoded video signal to the image output controller 136.

Image Output Controller 136

The image output controller 136 displays, as a through video, the video signal input from the camera signal processing circuit 134 on the display panel 120. Furthermore, the image output controller 136 transmits the video signal encoded by the encoder 138 to the information processing apparatus 200.

In the foregoing, the function configuration of the image-capturing devices 102 and 104 according to the present embodiment has been described. As described above, the image-capturing devices 102 and 104 record the video signal captured via the image sensor 112 on the recording medium 122 or display the video signal as a through video on the display panel 120. Furthermore, the image-capturing devices 102 and 104 transmit the encoded video signal to the information processing apparatus 200. However, in a case where the image-capturing devices 102 and 104 are connected to the information processing apparatus 200 through a high-speed transmission path or are connected using a connection cable through which a video signal can be transmitted, a video signal before being encoded may be directly transmitted to the information processing apparatus 200.

Function Configuration of Information Processing Apparatus 200

Figure 4:
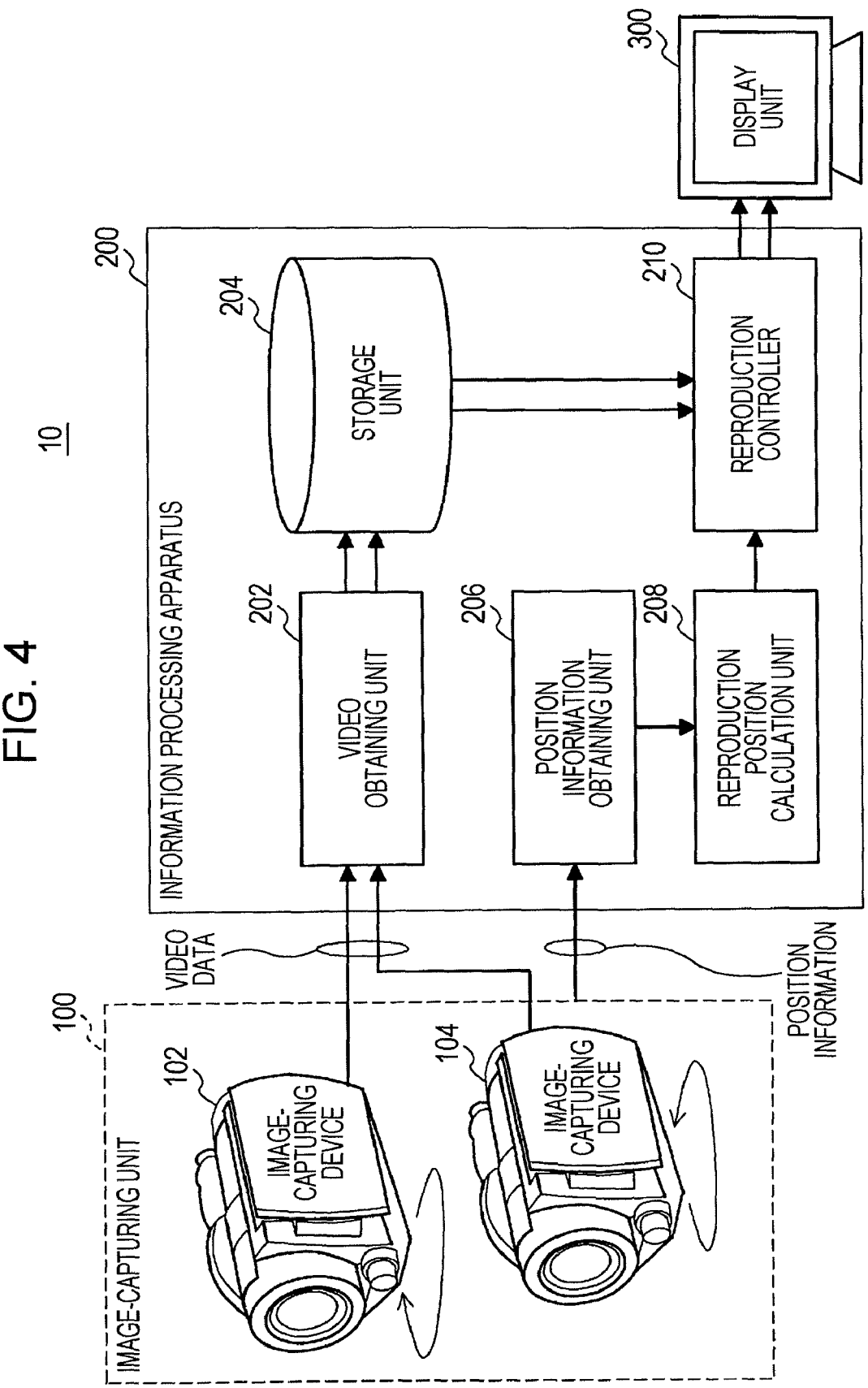
FIG. 4 is an illustration showing an example of functions of an information processing apparatus according to the present embodiment.

Next, a description will be given, with reference to FIG. 4, of the function configuration of the information processing apparatus 200 according to the present embodiment. FIG. 4 is an illustration showing an example of the function configuration of the information processing apparatus 200 according to the present embodiment. In FIG. 4, for the convenience of description, in addition to the information processing apparatus 200, the configuration of the image-capturing unit 100 is also shown.

As shown in FIG. 4, the information processing apparatus 200 includes a video obtaining unit 202, a storage unit 204, a position information obtaining unit 206, a reproduction position calculation unit 208, and a reproduction controller 210. Furthermore, the information processing apparatus 200 is connected to a display unit 300. However, the display unit 300 may be incorporated in the information processing apparatus 200.

Video Obtaining Unit 202, Storage Unit 204

The video obtaining unit 202 obtains a plurality of items of video data from the plurality of image-capturing devices 102 and 104 connected to the information processing apparatus 200. Individual video data obtained by the video obtaining unit 202 is recorded in the storage unit 204. Videos recorded in the storage unit 204 are individual videos corresponding to "video of camera A" and "video of camera B" shown in FIG. 1. Individual videos recorded in the storage unit 204 are read by the reproduction controller 210 (to be described later).

Position Information Obtaining Unit 206

The position information obtaining unit 206 obtains the position information of the plurality of image-capturing devices 102 and 104 from the image-capturing unit 100 connected to the information processing apparatus 200. This position information includes the angle of view during image capturing, which corresponds to each of the image-capturing devices 102 and 104, and the image-capturing directions of the image-capturing devices 102 and 104. Furthermore, this position information may include, for example, the individual positions of the image-capturing devices 102 and 104 on a plane horizontal to the rack 108, or three-dimensional positions including the direction vertical to the rack 108. The position information obtained by the position information obtaining unit 206 is input to the reproduction position calculation unit 208.

Reproduction Position Calculation Unit 208

On the basis of the position information obtained by the position information obtaining unit 206, the reproduction position calculation unit 208 calculates the reproduction position of the video captured by each of the image-capturing devices 102 and 104. That is, the reproduction position calculation unit 208 calculates the direction, the orientation, and the like at which individual videos are projected. At this time, the reproduction position calculation unit 208 causes the direction and the angle of view at which the video captured by the image-capturing device 102 is projected to match the image-capturing direction and the angle of view of the image-capturing device 102. In a similar manner, the reproduction position calculation unit 208 causes the direction and the angle of view at which the video captured by the image-capturing device 104 is projected to match the image-capturing direction and the angle of view of the image-capturing device 104. By determining the reproduction position under such a condition, the duplicated portions of the two videos are displayed in a correctly overlapping manner, and is displayed like the combined image of FIG. 1.

Figure 5:
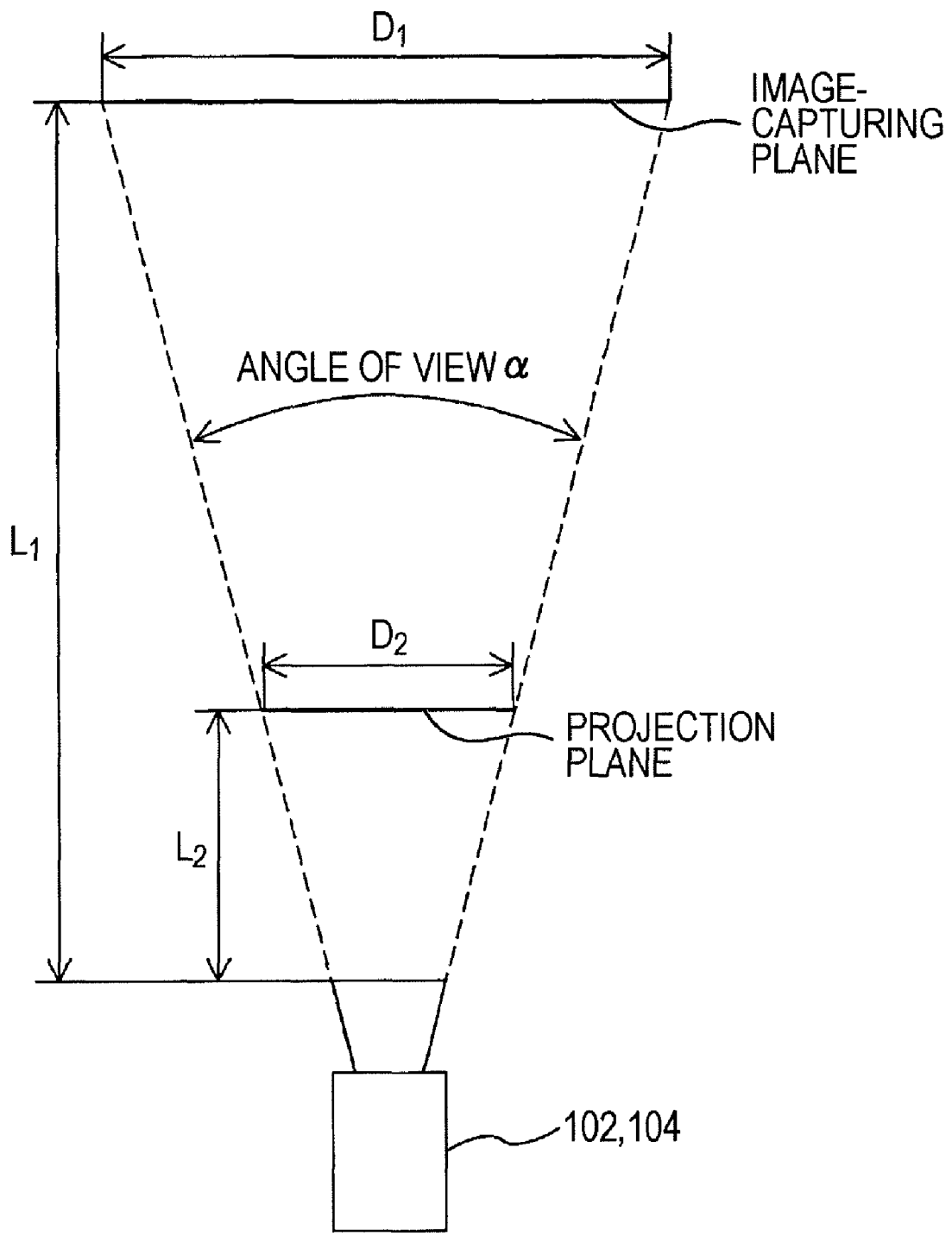
FIG. 5 is an illustration showing the definition of an angle of view.

Here, a description will be given of a method of calculating the reproduction position by the reproduction position calculation unit 208. First, with reference to FIG. 5, the definition of an angle of view will be described. FIG. 5 is an illustration showing the definition of an angle of view. When the dimension of a frame is denoted as D and the effective focal length is denoted as f, the angle of view $\alpha$ is represented as in Expression (1) described below. However, the dimension of the frame referred to herein is the dimension on the projection plane or the image-capturing plane, which is shown in FIG. 5. The dimension is a width in the vertical/horizontal/depth direction or the like.

$$\alpha = 2 \times \arctan(D/2f) \qquad (1)$$

As can be seen from FIG. 5 and Expression (1) above, if the dimension D of the frame is changed, the same angle of view $\alpha$ can be maintained by changing the focal length f. In contrast, it is possible to change the dimension D of the frame by adjusting the focal length f with respect to the same angle of view $\alpha$. Based on such a relationship, the following holds. As shown in FIG. 5, in a case where the image-capturing devices 102 and 104 having an angle of view $\alpha$ is set to a focal length L1 and an image of a subject is captured, it is possible to capture a video on an image-capturing plane in which the dimension is D1. In contrast, in a case where this video is projected on the projection plane of a dimension D2 using a motion-picture projector having an angle of view $\alpha$, the video is correctly displayed by setting the focal length to L2.

Figure 6:
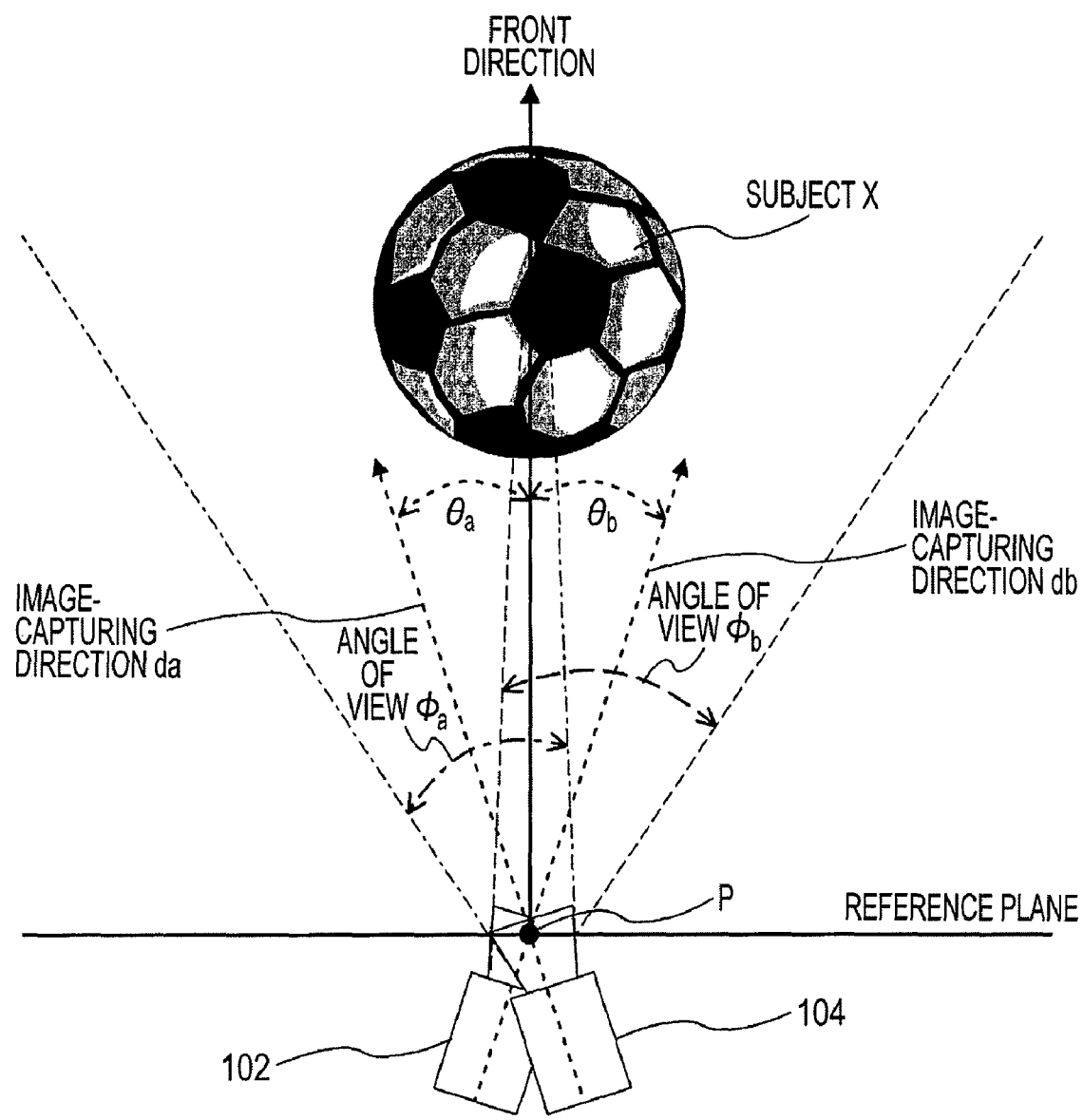
FIG. 6 is an illustration showing an example of position information according to the present embodiment.
Figure 7:
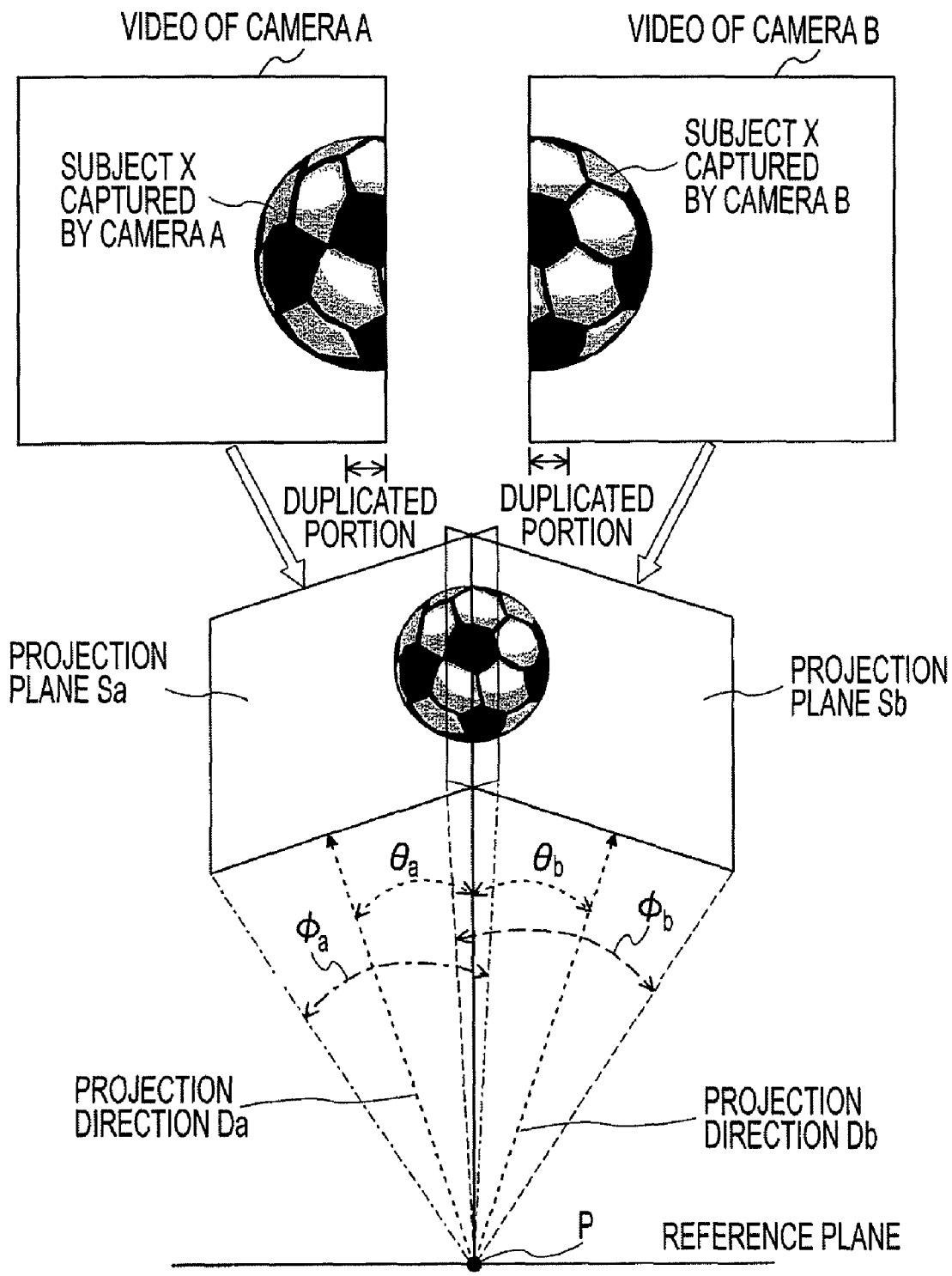
FIG. 7 is an illustration showing a method of calculating a reproduction position according to the present embodiment.

Keeping such a relationship in mind and with reference to FIGS. 6 and 7, a case in which videos captured by the two image-capturing devices 102 and 104 are combined and displayed will be considered. Here, the image-capturing device 102 will be referred to as a camera B and the image-capturing device 104 as a camera A. FIG. 6 schematically shows position information in a case where an image of a subject X is captured by the camera A and the camera B. FIG. 7 schematically shows the arrangement relationship of a reproduction position at which each video is reproduced so that two videos captured by the camera A and the camera B are combined and displayed.

First, reference is made to FIG. 6. The image-capturing direction of the camera A is da. The image-capturing direction da is directed in a direction inclined by an angle $\theta a$ from the front direction vertical to the reference plane. The angle of view of the camera A is $\phi a$. In a similar manner, the image-capturing direction of the camera B is db. The image-capturing direction db is directed in a direction inclined by an angle θb from the front direction vertical to the reference plane. The angle of view of the camera B is φb. For the convenience of description, it is represented in such a manner that a line indicating the image-capturing direction da of the camera A intersects a line indicating the image-capturing direction db of the camera B, and the intersection point thereof is denoted as a reference point P.

As described above, in a case where a video in a wide range including the subject X is to be captured, it is necessary to set the image-capturing directions da and db of the camera A and the camera B in such a manner as for their field of view to overlap each other. For this reason, one or both of the angles θa and θb are adjusted manually or by the driving controller 152. Furthermore, the focal lengths of the camera A and the camera B are adjusted so as to be focused to the subject X. As described above, the focal length is determined on the basis of the distance between the camera A and the subject X and between the camera B and the subject X. After that, the angle of view φa and the angle of view φb should be adjusted on the basis of the dimension of the image-capturing plane. At this time, for the dimension of the image-capturing plane, a desired image-capturing range is set in such a manner as to include the subject X. For example, the image-capturing range is set so as to include the entire field.

The image-capturing direction da and the angle of view φa of the camera A, and the image-capturing direction db and the angle of view φb of the camera B, which are set as described above, are stored as position information. For example, this position information is transmitted from the camera A and the camera B to the information processing apparatus 200, whereby the position information is stored in the information processing apparatus 200.

Next, reference is made to FIG. 7. The video of the subject x captured with the camera arrangement of FIG. 6 includes a duplicated portion with respect to each other as shown in FIG. 7. Accordingly, the reproduction position calculation unit 208 calculates the reproduction position at which the video of the camera A and the video of the camera B are arranged so that the duplicated portions correctly match each other. The reproduction position calculation unit 208 uses, as position information during image capturing, the image-capturing direction da and the angle of view φa of the camera A and the image-capturing direction db and the angle of view φb of the camera B.

As described with reference to FIG. 5 and Expression (1) described above, if the angles of view are the same, even if the dimension of the image-capturing plane differs from the dimension of the projection plane, it is possible to correctly project the video by adjusting the focal length. Furthermore, as a result of the video being projected in the same direction as the image-capturing directions of the camera A and the camera B, a subject image is correctly reproduced. Accordingly, by using, as a base point, the point P on the reference plane on which a motion-picture projector is disposed, the reproduction position calculation unit 208 causes the projection direction Da in which the video of the camera A is projected to match the image-capturing direction da and causes the angle of view thereof to be set to φa. However, since the distance from the base point P to the projection plane Sa differs from the distance from the camera A to the subject X, the focal length is adjusted during projection.

In a similar manner, by using, as a base point, the point P on the reference plane on which the motion-picture projector is disposed, the reproduction position calculation unit 208 causes the projection direction Db in which the video of the camera B is projected to match the image-capturing direction db and causes the angle of view thereof to set to φb. However, since the distance from the base point P to the projection plane Sb differs from the distance from the camera B to the subject X, the focal length is adjusted during projection. As a result of the direction in which the video of the camera A and the video of the camera B are projected being adjusted in the manner described above, the videos are displayed on the desired projection planes Sa and Sb in such a manner that the duplicated portions of the videos correctly match each other. The reproduction position calculation unit 208 calculates such positions of the projection planes Sa and Sb as reproduction positions.

Reference is made to FIG. 4 again. The reproduction position calculated by the reproduction position calculation unit 208 is input to the reproduction controller 210. However, the information on the reproduction position is input as coordinate information in the three-dimensional space or is input as information on the two-dimensional coordinates obtained by projectively transforming the projection planes Sa and Sb into the two-dimensional plane.

Reproduction Controller 210

Figure 8:
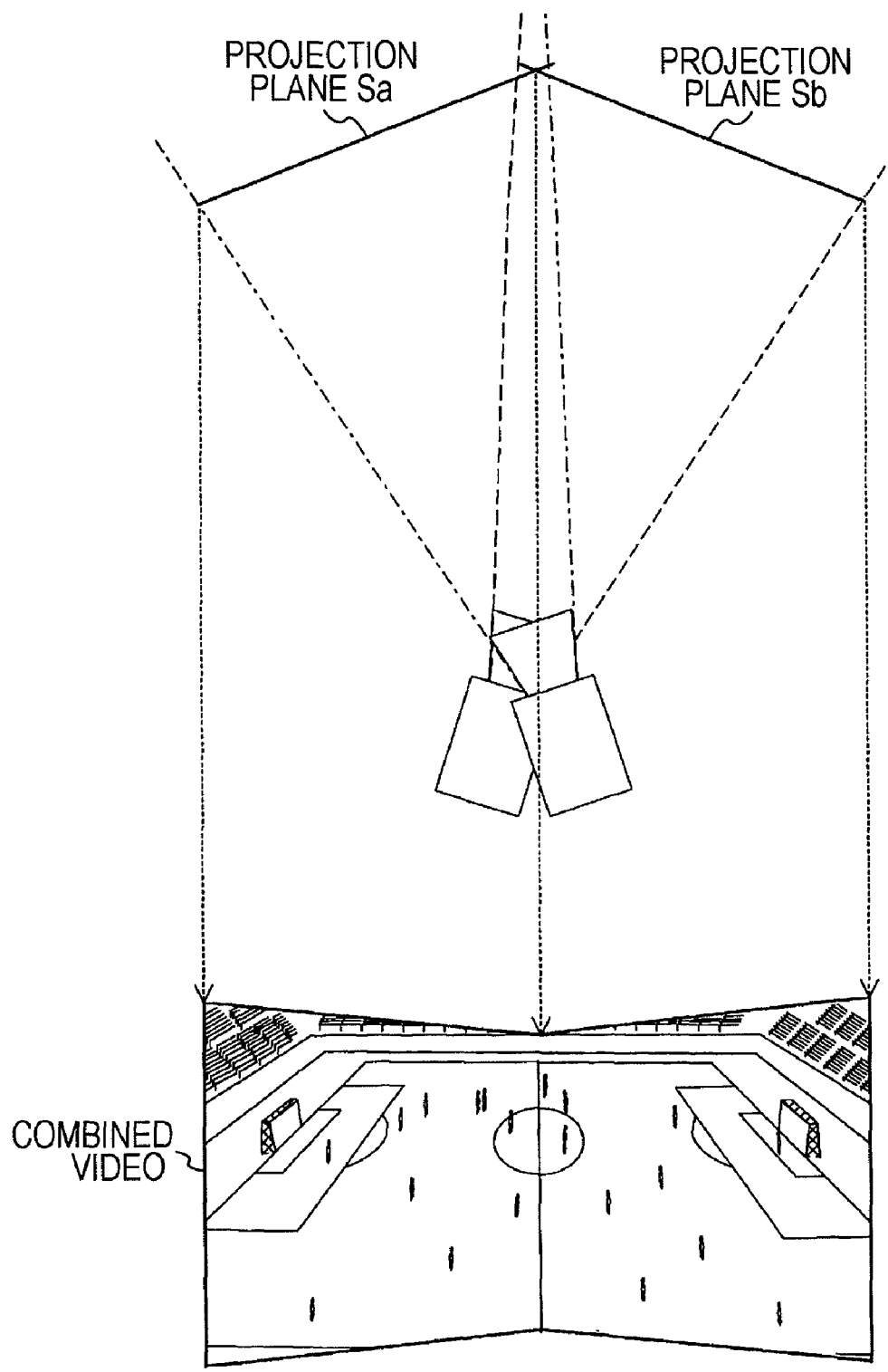
FIG. 8 is an illustration showing the relationship between a reproduction position and a combined image according to the present embodiment.

On the basis of the information on the reproduction positions calculated by the reproduction position calculation unit 208, the reproduction controller 210 causes the display unit 300 to display videos captured by the image-capturing devices 102 and 104 (cameras B and A). For example, in a case where two videos shown in FIG. 1 are captured, as shown in FIG. 8, the reproduction controller 210 projects each video at each reproduction position corresponding to the image-capturing orientation and the angle of view of each of the cameras A and B. In practice, the videos are displayed in such a manner that the projection planes Sa and Sb are arranged in a virtual three-dimensional space in which the coordinate of the depth direction is added to the two-dimensional plane on the display screen possessed by the display unit 300 and each video is projected.

At this time, the important point is that the position detection of the duplicated portions and the image combining process have not been performed. That is, the important point is that, simply, independent two videos are arrayed and displayed. This basically differs from the technique in which the corresponding points of two videos are calculated and combined. In the technology according to the present embodiment, the corresponding point of two videos is not calculated, and independent two videos are arrayed and displayed. As a consequence, since it is not necessary to perform high load computation that has been necessary thus far in a video combining process, it becomes possible to display a combined video with a comparatively inexpensive apparatus.

Regarding the duplicated portions, for example, control may be performed so that only the duplicated portion of the video positioned in the foreground toward the depth direction is displayed. As shown in FIG. 8, for the combined video displayed on the display unit 300 by the reproduction controller 210, the outer frame is distorted in the form of a trapezoid, which is caused by the inclination in the image-capturing direction from the front direction. Therefore, the reproduction controller 210 may cut an upper and lower portion so that the combined video has a rectangular outer shape and is displayed. The combined video on which such a process has been performed is presented to a user via, for example, an interface shown in FIG. 9.

Figure 9:
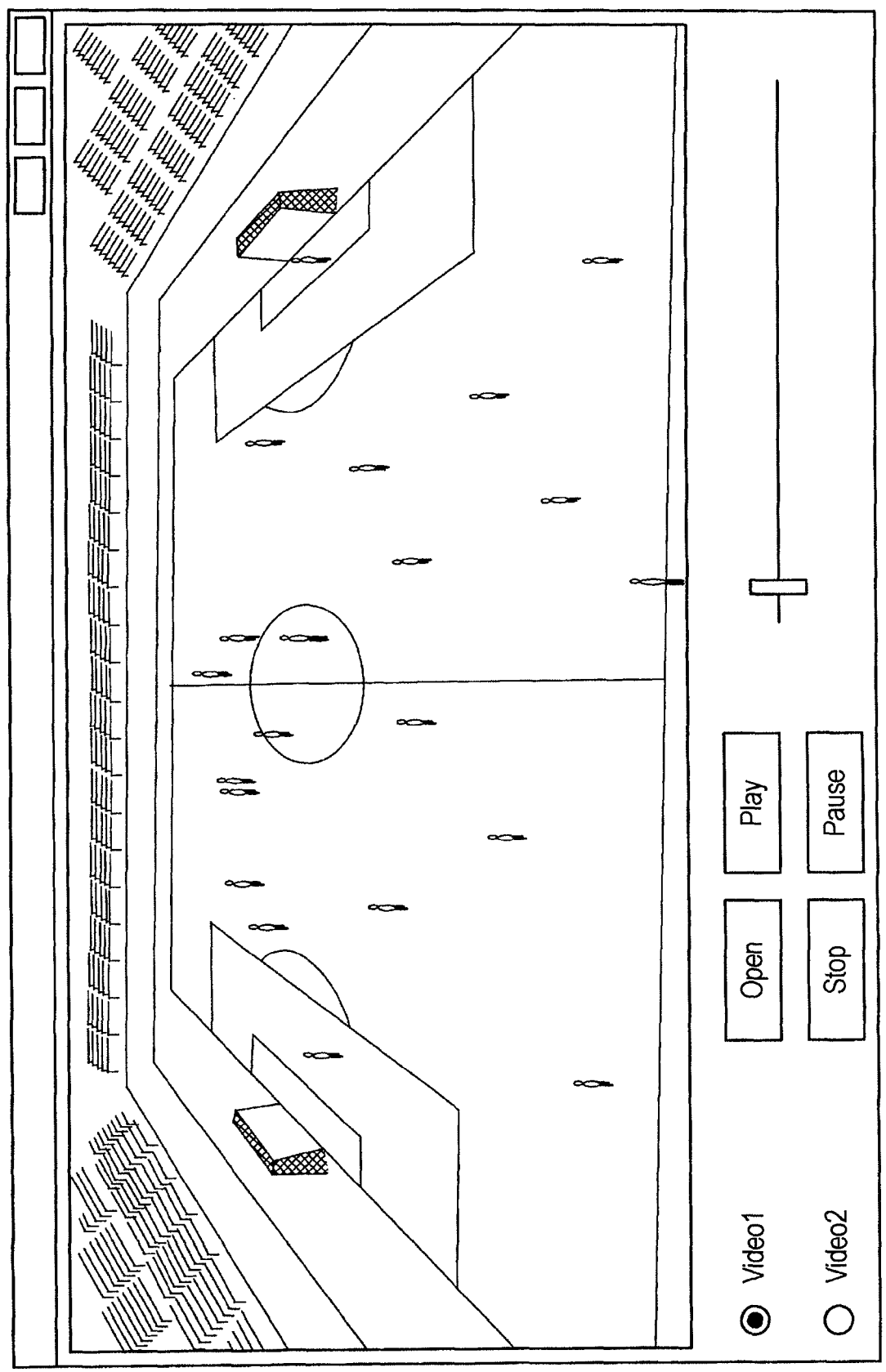
FIG. 9 is an illustration showing an example of a playback screen according to the present embodiment.

As described above, the video of the camera A and the video of the camera B are not combined by image processing, and these videos are displayed independently of each other. For this reason, it is possible to independently perform display control with respect to each video. That is, only one of the videos can easily be moved, zoomed in/out, and rotated on the screen. Accordingly, as shown in FIG. 9, it is possible to increase the degree of freedom of user operation by providing, as an interface, a radio button and a check box for individually specifying videos or by providing operation buttons for play/pause/stop, and the like for individual specified videos.

In the foregoing, the function configuration of the information processing apparatus 200 according to the present embodiment has been described. As described above, in the information processing apparatus 200, a combined display is realized without performing image processing on each video by appropriately arranging videos captured by the plurality of image-capturing devices 102 and 104. In particular, in the present embodiment, as a method of arranging each video, a technique in which the image-capturing direction and the angle of view corresponding to the image-capturing devices 102 and 104 match the projection direction and the angle of view of each video has been proposed. With this technique, it is possible to cause duplicated portions of videos to correctly match each other without performing a high load process like map matching, and creation of a panoramic view of videos is realized.

Flow of Recording Process

Figure 10:
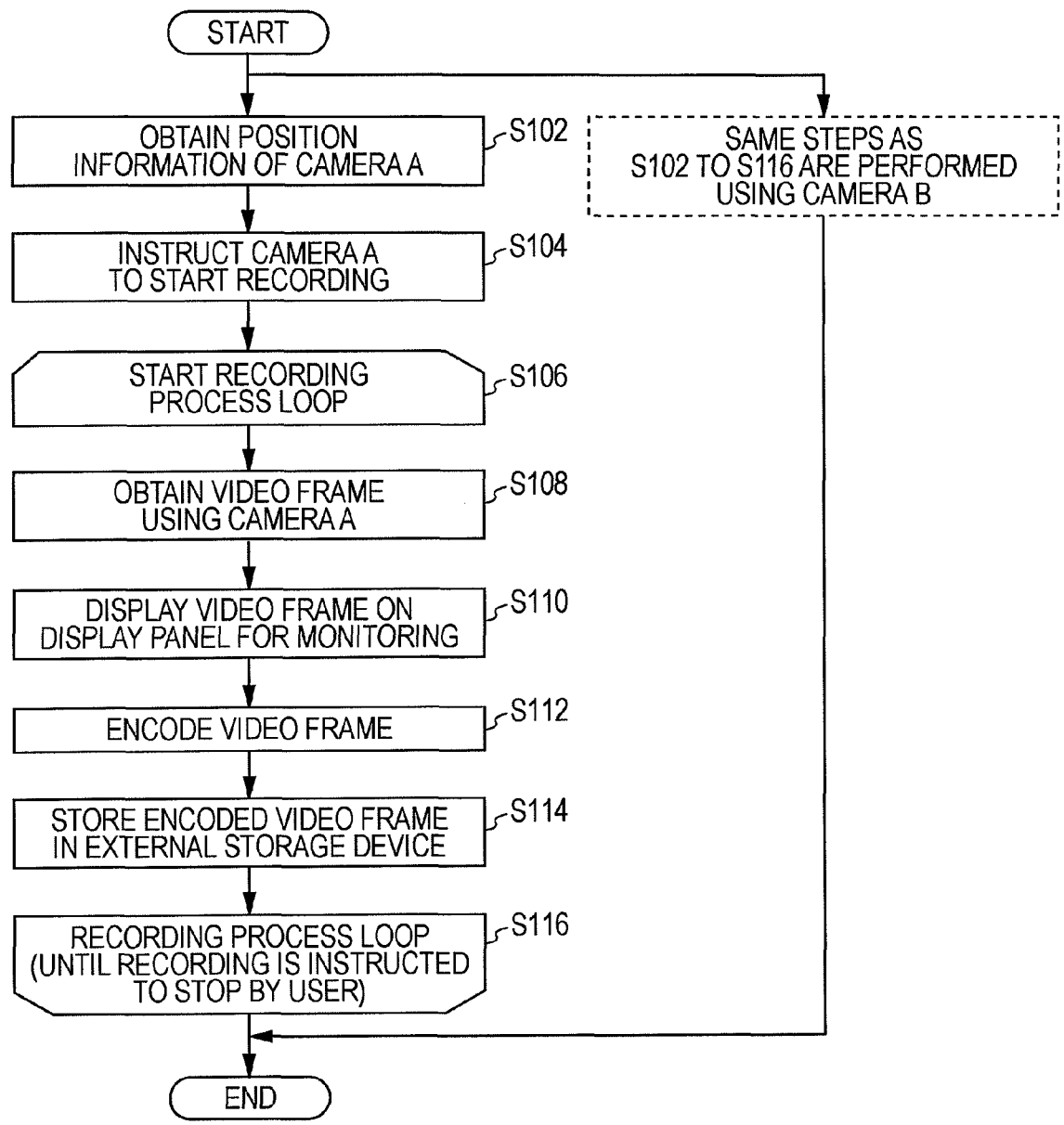
FIG. 10 is an illustration showing the flow of a recording process according to the present embodiment.

Next, a description will be given, with reference to FIG. 10, of the flow of a recording process performed by the image-capturing system 10 according to the present embodiment. FIG. 10 is an illustration showing the flow of a recording process according to the present embodiment. A series of steps described herein is mainly performed by the information processing apparatus 200.

As shown in FIG. 10, first, the position information of the camera A is obtained by the information processing apparatus 200 (S102). Next, the camera A is instructed to start recording (S104). Next, the loop of the recording process is started (S106).

In this recording process loop, first, a video frame is obtained using the camera A (S108). Next, the video frame is displayed on the display panel for monitoring purposes (S110). At this time, the video frame may be displayed on the display panel 120 of the camera A or may be transmitted to the information processing apparatus 200 and displayed on the display unit 300. Next, the video frame is encoded (S112). Next, the encoded video frame is stored in an external storage device (S114). At this time, for the external storage device, for example, the recording medium 122, the storage unit 204, or the like is used.

Next, it is determined whether or not the recording process loop should be completed. In the case that the recording process loop continues, a series of steps starting from step S108 is repeatedly performed (S116). The continuation/completion of the recording process loop is determined on the basis of the presence or absence of a recording stop instruction by the user. In the case that the stopping of recording has been instructed by the user, in step S116, the recording process loop is completed. On the other hand, in the case that the stopping of recording has not been instructed by the user, the recording process loop of steps S108 to S116 is repeatedly performed. When the recording process loop is completed in step S116, the series of steps related to the recording process is completed.

The above-described series of steps S102 to S116 is performed in a similar manner for the camera B. As described above, recording processes are performed in parallel for the camera A and the camera B. As a result, individual videos captured using the camera A and the camera B are recorded in the storage unit 204 of the information processing apparatus 200. In a case where video data is recorded on the recording media 122 of the camera A and the camera B, after the recording processes are completed, the video data recorded on each recording medium 122 is read by the information processing apparatus 200 and is recorded in the storage unit 204.

Flow of Reproduction Process

Figure 11:
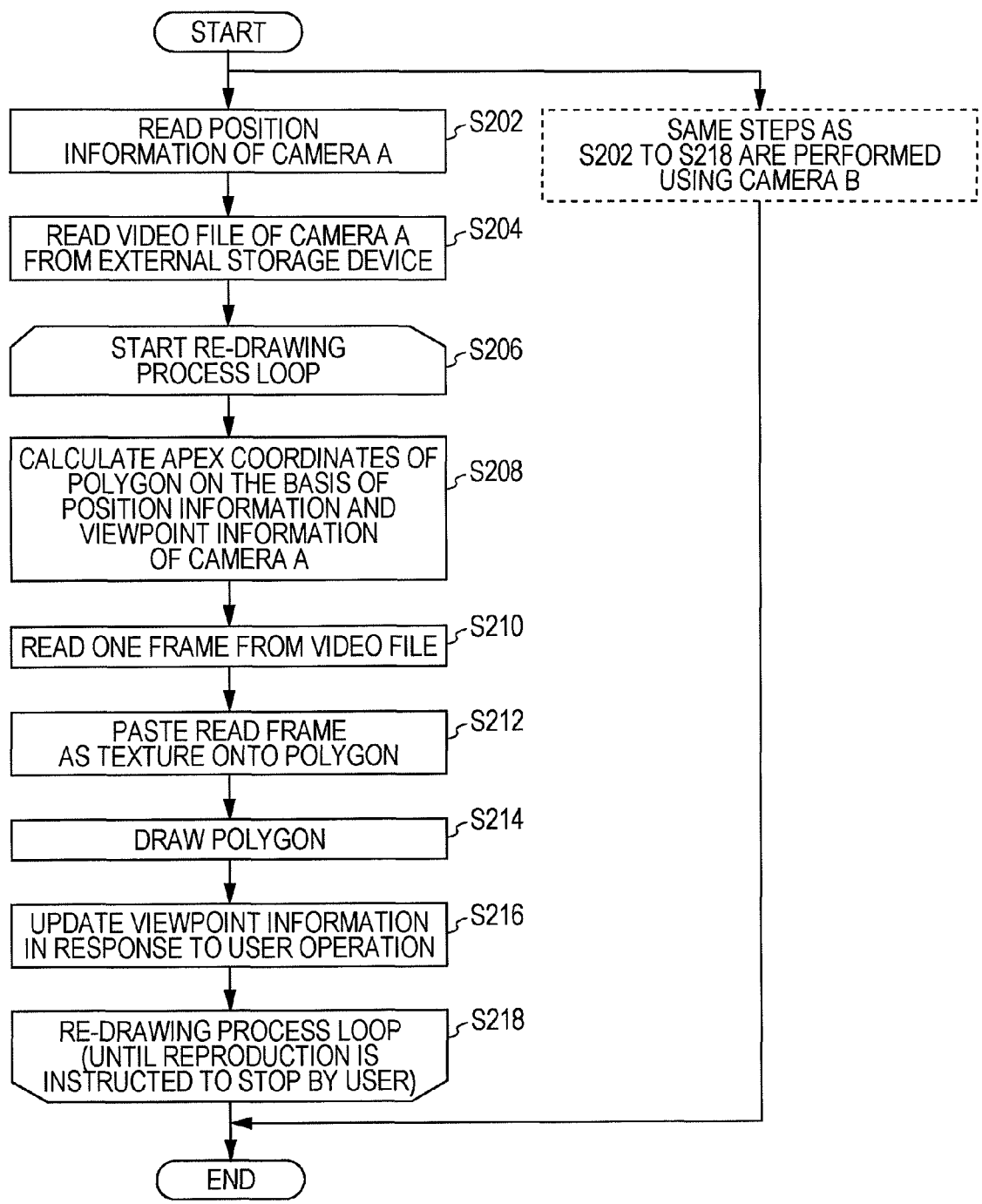
FIG. 11 is an illustration showing the flow of a reproduction process according to the present embodiment.

Next, a description will be given, with reference to FIG. 11, the flow of a reproduction process performed by the information processing apparatus 200 according to the present embodiment. FIG. 11 is an illustration showing the flow of a reproduction process according to the present embodiment.

As shown in FIG. 11, first, the position information of the camera A is read in by the information processing apparatus 200 (S202). Next, a video file of the camera A is read from an external storage device (S204). Here, the external storage device is represented so as to deal with the above-described recording process. Therefore, in this step, a video file recorded, for example, on the recording medium 122 of the camera A or in the storage unit 204 is read.

Next, a re-drawing process loop is started (S206). First, on the basis of the position information and the viewpoint information of the camera A, the apex coordinates of a polygon are calculated (S208). This process is mainly performed by the reproduction position calculation unit 208. The viewpoint information is information about in what viewpoint the video should be viewed and is specified by the user. The polygon referred to herein refers to each element in a case where an object body is represented by a combination of polygons, such as a triangle, a rectangle, and the like in three-dimensional computer graphics. That is, the projection plane on which a video is projected is intended to be represented by the position in a virtual three-dimensional space in computer graphics.

Next, video data for one frame is read in from a video file by the information processing apparatus 200 (S210). Next, the read frame is pasted as texture to the polygon (S212). Texture usually refers to an image pasted to represent the feel of a material on the surface of an object body in three-dimensional computer graphics. Here, a process for pasting a video frame as texture onto a polygon is performed. Next, the polygon having the video frame pasted thereon is drawn on the screen (S214). Furthermore, the viewpoint information is updated in response to user operation (S216).

Next, it is determined whether or not the re-drawing process loop should be completed. When the re-drawing process loop continues, a series of steps starting from step S208 is repeated (S218). The continuation/completion of the re-drawing process loop is determined on the basis of the presence or absence of the reproduction stop instructions from the user. When the user has instructed the stopping of reproduction, the re-drawing process loop is completed in step S218. On the other hand, the user has not instructed the stopping of reproduction, the re-drawing process loop of steps S208 to S218 is repeated. When the re-drawing process loop is completed in step S218, the series of steps related to the reproduction process is completed.

The above-described series of steps S202 to S218 is performed in a similar manner for the video of the camera B. As described above, reproduction processes are performed in parallel for the videos of the camera A and the camera B. As a result, on the display unit 300, videos captured by the camera A and the camera B are reproduced in synchronization with each other. At this time, the reproduction controller 210 adjusts the reproduction time so that, regarding the time of the video frame, the image-capturing times are synchronized between the video of the camera A and the video of the camera B. As a result, two videos are reproduced on the display unit 300 in synchronization with each other. However, the construction may be formed in such a way that the offset of a time frame is compensated for.

In the foregoing, the flows of the recording process and the reproduction process according to the present embodiment have been described. As described above, the image-capturing directions and the angles of view during image capturing by the camera A and the camera B are stored. As a consequence, the projection directions and the angles of view of the videos are adjusted so as to match individual image-capturing directions and angles of view, making it possible to easily combine and display a plurality of videos in a virtual three-dimensional space.

Modification of Configuration of Image-Capturing System 10

Figure 12:
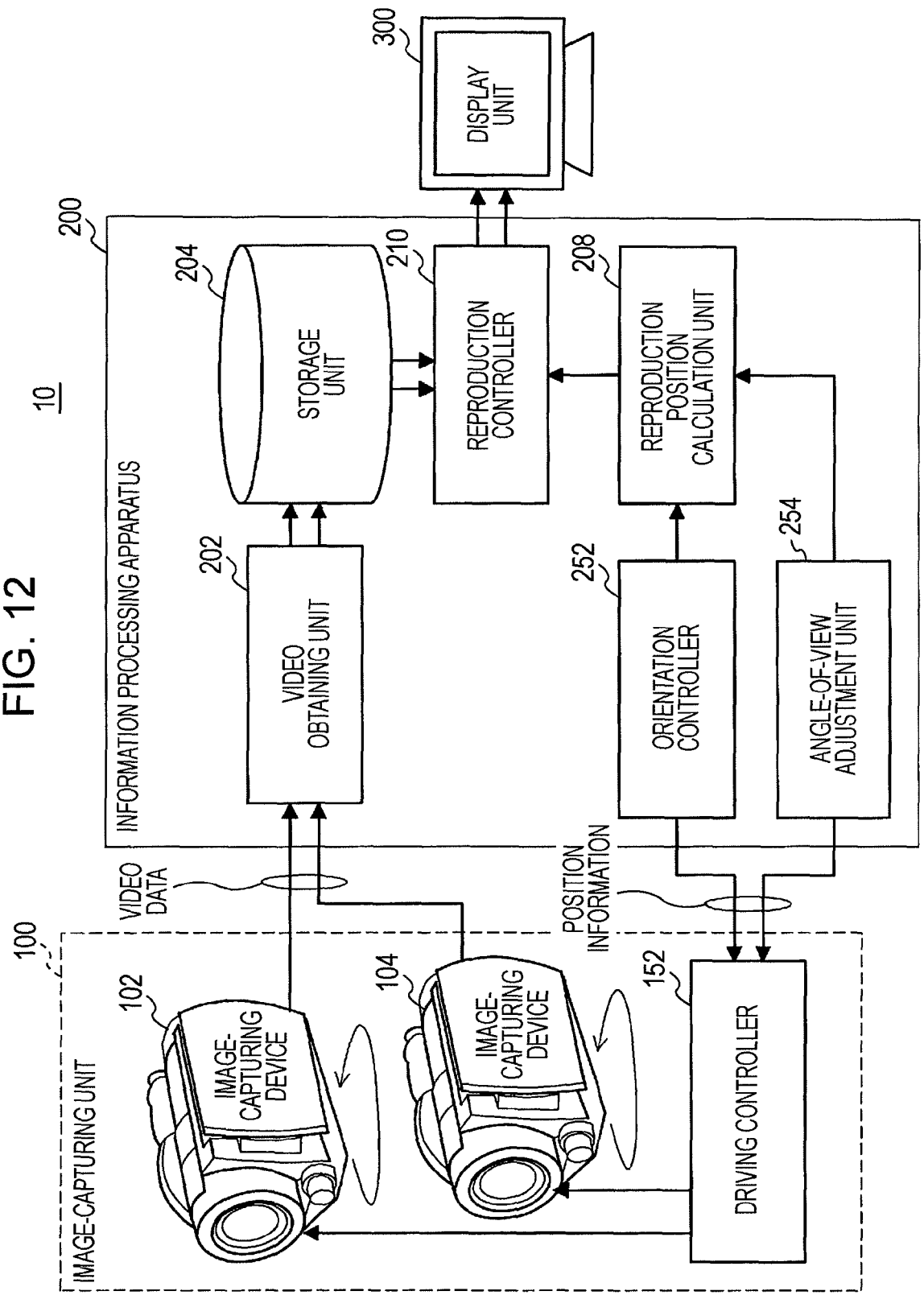
FIG. 12 is an illustration showing a modification of the image-capturing system according to the present embodiment.

Next, a description will be given, with reference to FIG. 12, the system configuration of the image-capturing system 10 according to a modification of the present embodiment. FIG. 12 is an illustration showing the system configuration of the image-capturing system 10 according to a modification of the present embodiment. The modification is such that the image-capturing directions and the angles of view of the image-capturing devices 102 and 104 are controlled by the information processing apparatus 200. Accordingly, only the components related to means for the control are described, components having substantially the same functions as those of the information processing apparatus 200 shown in FIG. 4 are designated with the same reference numerals, and detailed descriptions thereof are omitted.

Modified Portion of Image-Capturing Unit 100

As shown in FIG. 12, the image-capturing unit 100 according to the present modification includes, in addition to plural image-capturing devices 102 and 104, a driving controller 152. The driving controller 152 is mechanically and electrically connected to the plurality of image-capturing devices 102 and 104 so that the image-capturing directions and the angles of view of the image-capturing devices 102 and 104 can be controlled. Furthermore, the driving controller 152 obtains control information from the information processing apparatus 200 and controls the image-capturing directions and the angles of view of the image-capturing devices 102 and 104 on the basis of the control information.

Modified Portion of Information Processing Apparatus 200

The information processing apparatus 200 according to the present modification includes, in place of the position information obtaining unit 206 shown in FIG. 4, a direction controller 252 and an angle-of-view adjustment unit 254. The direction controller 252 controls the driving controller 152 of the image-capturing unit 100 so that the image-capturing directions of the image-capturing devices 102 and 104 are controlled. On the other hand, the angle-of-view adjustment unit 254 controls the driving controller 152 of the image-capturing unit 100 so that the angles of view of the image-capturing devices 102 and 104 are adjusted. As described above, the information processing apparatus 200 according to the present modification has a function as a control apparatus for controlling position information related to the image-capturing unit 100.

For this reason, the direction controller 252 has stored therein information regarding the image-capturing directions of the image-capturing devices 102 and 104, and inputs the information on the image-capturing directions to the reproduction position calculation unit 208 when control information is transmitted to the image-capturing unit 100. Similarly, the angle-of-view adjustment unit 254 has stored therein information regarding the angles of view of the image-capturing devices 102 and 104, and inputs the information on the angle of view to the reproduction position calculation unit 208 when control information is transmitted to the image-capturing unit 100. With such a configuration, similarly to the case of the information processing apparatus 200 shown in FIG. 4, it is possible for the reproduction position calculation unit 208 to calculate the reproduction positions of the videos captured by the image-capturing devices 102 and 104.

In the foregoing, a modification of the present embodiment has been described. As described above, various modifications are possible with regard to the configuration for driving and controlling the image-capturing devices 102 and 104. In particular, as to by which component position information should be stored in advance or as to from which component position information should be obtained can be freely modified. Finally, an example of the hardware configuration of the information processing apparatus 200 will be described. The correspondence between the hardware configuration and the above-described function configuration is as follows.

Correspondence

The functions of the video obtaining unit 202, the position information obtaining unit 206, the reproduction position calculation unit 208, and the reproduction controller 210 are realized by a CPU 902 on the basis of a program recorded in a ROM 904, a RAM 906, a storage unit 920, or a removable recording medium 928. Furthermore, the functions of the direction controller 252 and the angle-of-view adjustment unit 254 are also realized by the CPU 902 on the basis of a program recorded in the ROM 904, the RAM 906, the storage unit 920, or the removable recording medium 928. Furthermore, the function of the storage unit 204 is realized by the RAM 906, the storage unit 920, or the removable recording medium 928. The function of the display unit 300 is realized by an output unit 918. However, in a case where the display unit 300 has a function as input means, such as a touch panel, the display unit 300 also serves as an input unit 916.

Hardware Configuration (Information Processing Apparatus 200)

The function of each component possessed by the above-described apparatus can be realized, for example, by an information processing apparatus having hardware configuration shown in FIG. 13 by using a computer program to implement the above-described functions. FIG. 13 is an illustration showing the hardware configuration of an information processing apparatus capable of implementing the function possessed by each component of the above-described apparatus. The form of the information processing apparatus is arbitrary, and examples of the form include a portable information terminal, such as a personal computer, a mobile phone, a personal handy-phone system (PHS), or a personal digital assistant (PDA), a game machine, or various kinds of home information appliances.

As shown in FIG. 13, the above-described information processing apparatus mainly includes a central processing unit (CPU) 902, a read-only memory (ROM) 904, a random access memory (RAM) 906, a host bus 908, a bridge 910, an external bus 912, an interface 914, an input unit 916, an output unit 918, a storage unit 920, a drive 922, a connection port 924, and a communication unit 926.

The CPU 902 functions as, for example, an arithmetic processing unit or a control unit, and controls the overall operation of each component or part thereof in accordance with various kinds of programs recorded in the ROM 904, the RAM 906, the storage unit 920, or the removable recording medium 928. The ROM 904 has stored therein, for example, a program to be read into the CPU 902, data used for computations, and the like. The RAM 906 temporarily or permanently stores, for example, a program to be read into the CPU 902, various kinds of parameters that change as appropriate when the program is executed, and the like. These components are interconnected with one another, for example, via a host bus 908 capable of high-speed data transmission. The host bus 908 is connected, for example, via the bridge 910, to the external bus 912 in which a data transmission speed is comparatively low.

The input unit 916 is operation means, such as, for example, a mouse, a keyboard, a touch panel, buttons, switches, and a lever. The input unit 916 may be remote control means (so-called a remote controller) capable of transmitting a control signal by using an infrared or other radio waves. The input unit 916 is constituted by, for example, an input control circuit for transmitting, as an input signal, information input using the operation means, to the CPU 902.

The output unit 918 is, for example, a device capable of visually or auditorily notifying the user of obtained information, such as a display device such as a cathode ray tube (CRT), a liquid-crystal display (LCD), a plasma display panel (PDP), or an electro-luminescent display (ELD), an audio output device such as a speaker and/or a headphone, a printer, a mobile phone, a facsimile, or the like.

The storage unit 920 is a device for storing various kinds of data, and is formed of a magnetic storage device such as a hard disk drive (HDD), a semiconductor storage device, an optical storage device, or a magneto-optical storage device.

The drive 922 is, for example, a device that reads information recorded on the removable recording medium 928, such as a magnetic disk, an optical disc, a magneto-optical disc, or a semiconductor memory, and that writes information to the removable recording medium 928. Examples of the removable recording medium 928 include a digital versatile disc (DVD) medium, a Blu-ray medium, a high-definition (HD) DVD medium, a compact flash (CF) (registered trademark), a memory stick, and a secure digital (SD) memory card. Of course, the removable recording medium 928 may be an integrated circuit (IC) card in which a non-contact IC chip is installed, or an electronic device.

The connection port 924 is, for example, a USB (Universal Serial Bus) port, an IEEE 1394 port, a small computer system interface (SCSI) port, an RS-232C port, or a port to which an external connected device 930 such as an optical audio terminal is connected. Examples of the external connected device 930 include a printer, a portable music player, a digital camera, a digital video camera, and an IC recorder.

The communication unit 926 is a communication device for connection with a network 932. Examples thereof include a communication card for a wired or wireless local area network (LAN), Bluetooth (registered trademark), or a wireless USB (WUSB), a router for optical communication, a router for an asymmetric digital subscriber line (ADSL), and a modem for various kinds of communication. The network 932 connected to the communication unit 926 is formed of a network connected in a wired or wireless manner. Examples thereof include the Internet, a household LAN, infrared communication, visible light communication, broadcasting, and satellite communication.

In the foregoing description, an example of a configuration in which reproduction positions of videos captured using two cameras are arranged in a virtual three-dimensional space and a display process is performed in a software manner has been set forth. The present embodiment is not limited to this. For example, on the basis of the information on three-dimensional reproduction positions calculated by the reproduction position calculation unit 208, a plurality of motion-picture projectors may be driven and controlled, and the videos may be projected on an actual screen. Furthermore, the storage unit 204 may be configured in such a manner that position information is recorded.

The functions of the information processing apparatus 200 can be implemented by any electronic device, such as a television receiver, a recording and reproduction device, a game machine, a portable information terminal, a mobile phone, and a home information appliance. The above-described direction controller 252 and the angle-of-view adjustment unit 254 are examples of the position information recorder.

The present application contains subject matter related to that disclosed in Japanese Priority Patent Application JP 2008-153557 filed in the Japan Patent Office on Jun. 11, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents hereof.

What is claimed is:

1. An information processing apparatus comprising:
 a video obtaining unit configured to obtain a plurality of items of video data captured by a plurality of image-capturing devices;
 a position information obtaining unit configured to obtain, position information including an orientation and an angle of view of each of the image-capturing devices;
 a reproduction position calculation unit configured to calculate a reproduction position of each item of the video data so that a projection direction and an angle of view of the item of the video data matches the orientation and the angle of view of a corresponding one of the image-capturing devices by using the position information; and
 a reproduction controller configured to reproduce each item of the video data at the corresponding reproduction position,
 wherein to reproduce each item of the video data apex coordinates of a polygon, representing an item of the video data, are calculated on the basis of the position information and a viewpoint information of one of the plurality of image-capturing devices, and
 wherein viewpoint information is information specified by a user and describes which viewpoint the reproduced video should be viewed.

2. The information processing apparatus according to claim 1,
 wherein the reproduction position calculation unit calculates a plane area on which a corresponding item of the video, data is projected as the reproduction position in a virtual three-dimensional space including the depth direction of a display screen, and
 wherein the reproduction controller reproduces each item of the video data in such a manner that the item of the video data is projected on the corresponding plane area in the virtual three-dimensional space, the plane area being calculated as the corresponding reproduction position.

3. The information processing apparatus according to claim 1, further comprising:
 a direction controller configured to control the orientations of the plurality of image-capturing devices so that portions of image-capturing ranges thereof overlap each other;
 an angle-of-view adjustment unit configured to adjust the angle of view of each of the image-capturing devices;

a position information recorder configured to record, as position information, the orientation of each of the image-capturing devices controlled by the direction controller and the angle of view of each of the image-capturing devices adjusted by the angle-of-view adjustment unit; and a storage unit in which video data captured by each of the image-capturing devices and the position information are recorded, wherein the video obtaining unit obtains the video data from the storage unit; and the position information obtaining unit obtains the position information from the storage unit.

4. An information processing apparatus comprising:

a direction controller configured to control the orientations of a plurality of image-capturing devices so that portions of an image-capturing range overlap each other;

an angle-of-view adjustment unit configured to adjust the angle of view of each of the image-capturing devices;

a position information recorder configured to record, as position information; the orientation of each of the image-capturing devices controlled by the direction controller and the angle of view of each of the image-capturing devices adjusted by the angle-of-view adjustment unit; and a storage unit in which video data captured by each of the image-capturing devices and the position information are recorded, wherein to reproduce each item of the video data, apex coordinates of a polygon, representing an item of the video data, are calculated on the basis of the position information and a viewpoint information of one of the plurality of image-capturing devices, and wherein viewpoint information is information is specified by a user and describes which viewpoint the reproduced video should be viewed.

5. An image-capturing system comprising:

a plurality of image-capturing units capable of changing their individual image-capturing directions and angles of view;

a direction controller configured to control the orientation of each of the plurality of image-capturing units so that portions of image-capturing ranges thereof overlap each other;

an angle-of-view adjustment unit configured to adjust the angle of view of each of the image-capturing units;

a position, information recorder configured to record, as position information, the orientation of each of the image-capturing units controlled by the direction controller and the angle of view of each of the image-capturing units adjusted by the angle-of-view adjustment unit; and a storage unit in which video data captured by each of the image-capturing units and the position information are recorded, wherein to reproduce each item of the video data, apex coordinates of a polygon, representing an item of the video data, are calculated on the basis of the position information and a viewpoint information of one of the plurality of image-capturing devices, and wherein viewpoint information is information is specified by a user and describes which viewpoint the reproduced video should be viewed.

6. A reproduction control method comprising the steps of:

obtaining a plurality of items of video data captured by a plurality of image-capturing devices;

obtaining position information including an orientation and an angle of view of each of the image-capturing devices;

calculating the reproduction position of each item of video data so that the projection direction and the angle of view of the item of the video data matches the orientation and the angle of view of a corresponding one of the image-capturing devices by using the position information; and performing control so that each item of the video data is reproduced at the corresponding reproduction position, wherein to reproduce each item of the video data, apex coordinates of a polygon, representing an item of the video data, are calculated on the basis of the position information and a viewpoint information of one of the plurality of image-capturing devices, and wherein viewpoint information is information is specified by a user and describes which viewpoint the reproduced video should be viewed.

7. A recording control method comprising the steps of:

controlling orientations of a plurality of image-capturing devices so that portions of image-capturing ranges overlap each other;

adjusting the angle of view of each of the image-capturing devices;

recording, as position information, the orientation of each of the image-capturing devices controlled in the step of controlling orientations and the angle of view of each of the image-capturing devices adjusted in the step of adjusting an angle of view; and recording video data captured by each of the image-capturing devices, wherein to reproduce each item of the video data, apex coordinates of a polygon, representing an item of the video data, are calculated on the basis of the position information and a viewpoint information of one of the plurality of image-capturing devices, and wherein viewpoint information is information is specified by a user and describes which viewpoint the reproduced video should be viewed.

8. A non-transitory computer readable medium for storing a program for causing a computer to implement, a reproduction control method comprising the steps of:

obtaining a plurality of items of video data captured by a plurality of image-capturing devices;

obtaining position information including an orientation and an angle of view of each of the image-capturing devices;

calculating the reproduction position of each item of video data so that the projection direction and the angle of view of the item of the video data matches the orientation and the angle of view of a corresponding one of the image-capturing devices by using the position information; and performing control so that each item of the video data is reproduced at the corresponding reproduction position, wherein to reproduce each item of the video data, apex coordinates of a polygon, representing an item of the video data, are calculated on the basis of the position information and a viewpoint information of one of the plurality of image-capturing devices, and wherein viewpoint information is information is specified by a user and describes which viewpoint the reproduced video should be viewed.

9. A non-transitory computer readable medium for storing a program for causing a computer to implement a recording control method comprising the steps of:

controlling orientations of a plurality of image-capturing devices so that portions of image-capturing ranges overlap each other;
adjusting the angle of view of each of the image-capturing devices;
recording, as position information, the orientation of each of the image-capturing devices controlled in the step of controlling orientations and the angle of view of each of the image capturing, devices adjusted in the step of adjusting an angle of view; and
recording video data captured by each of the image-capturing devices,
wherein to reproduce each item of the video data, apex coordinates of a polygon, representing an item of the video data, are calculated on the basis of the position information and a viewpoint information of one of the plurality of image-capturing devices, and
wherein viewpoint information is information is specified by a user and describes which viewpoint the reproduced video should be viewed.

* * * * *